(12) United States Patent
Kim et al.

(10) Patent No.: US 7,266,124 B2
(45) Date of Patent: Sep. 4, 2007

(54) METHOD FOR SETTING UP QOS SUPPORTED BI-DIRECTIONAL TUNNEL AND DISTRIBUTING L2VPN MEMBERSHIP INFORMATION FOR L2VPN USING EXTENDED LDP

(75) Inventors: Mi Hui Kim, Daejeon (KR); Jong Hyup Lee, Daejeon (KR); Yoo Kyoung Lee, Daejeon (KR)

(73) Assignee: Electronics and Telecommunications Research Institute (KR)

(*) Notice: Subject to any disclaimer, the term of this patent is extended or adjusted under 35 U.S.C. 154(b) by 1052 days.

(21) Appl. No.: 10/413,177

(22) Filed: Apr. 14, 2003

(65) Prior Publication Data

US 2004/0037296 A1 Feb. 26, 2004

(30) Foreign Application Priority Data

Aug. 21, 2002 (KR) .................. 10-2002-0049387

(51) Int. Cl.
*H04L 12/56* (2006.01)
(52) U.S. Cl. ............... 370/397; 370/395.3; 370/395.53
(58) Field of Classification Search ............... 370/397, 370/395.3, 395.53
See application file for complete search history.

(56) References Cited

U.S. PATENT DOCUMENTS

2003/0142674 A1* 7/2003 Casey .................. 370/393
2003/0174706 A1* 9/2003 Shankar et al. ............. 370/393
2003/0177221 A1* 9/2003 Ould-Brahim et al. ...... 709/223

FOREIGN PATENT DOCUMENTS

KR 1020020019164 3/2002
WO WO 03/005648 A2 * 1/2003

OTHER PUBLICATIONS

'Transport mechanism of the Ethernet frame over theMPLS network', M. Son, et al., Electronics and Telecommunications Research Institute, 5 pages, 2002.

* cited by examiner

*Primary Examiner*—Hassan Kizou
*Assistant Examiner*—Jay P. Patel
(74) *Attorney, Agent, or Firm*—Blakely Sokoloff Taylor & Zafman (57) ABSTRACT

The present invention presents a method for setting up a QoS (Quality-of-Service) supported bi-directional tunnel and distributing L2VPN (Layer-2 Virtual Private Network) membership information for an L2VPN using an extended LDP (Label Distribution Protocol). In a network providing MPLS based L2VPN service, which includes a plurality of VPN provider edges (PEs), a plurality of VPN customer edges (CEs) connected to the PEs and a VPN DNS (Domain Name Service) server for managing PE information associated with a plurality of VPNs, a PE registers information associated with the VPN DNS server to provide the L2VPN service, and uses the extended LDP for QoS supported bi-directional tunnel setup and the extended LDP for QoS supported L2VPN membership information distribution. A VPN CE needs only a simple Layer-2 connection providing function for the L2VPN service.

18 Claims, 8 Drawing Sheets

| VPN ID(Route Distinguisher from RFC2547) | list of members contained in corresponding VPN (PE IP address/Netmask) | list of CE members connected to each PE (VC connection information) |
|---|---|---|
| VPN 1(10:1) | PE1(10.10.10.1/255.255.255.0) | CE11(Port 1, VLAN ID 10) CE12(Port 2, VLAN ID 20) |
| | PE2(20.20.20.1/255.255.255.0) | CE21(Port 3, VLAN ID 10) |
| VPN 2(20:1) | PE1(10.10.10.1/255.255.255.0) | CE13(Port 1, VLAN ID 5) |
| | PE2(20.20.20.1/255.255.255.0) | CE22(Port 2, VLAN ID 5) CE23(Port 3, VLAN ID 15) |

• Label Mapping and Request Message

```
 0                   1                   2                   3
 0 1 2 3 4 5 6 7 8 9 0 1 2 3 4 5 6 7 8 9 0 1 2 3 4 5 6 7 8 9 0 1
```

| 0 | Label Mapping(0x0400) | Message Length |
|---|---|---|
| | Message ID | |
| | FEC TLV | |
| | Label TLV | |
| | sender's FEC TLV | |
| | Optional Parameters | |

• sender's FEC TLV

```
 0                   1                   2                   3
 0 1 2 3 4 5 6 7 8 9 0 1 2 3 4 5 6 7 8 9 0 1 2 3 4 5 6 7 8 9 0 1
```

| 1 | 1 | Type = 0x03E00 | Length |
|---|---|---|---|
| | | FEC Element 1 | |
| | | ⋮ | |
| | | FEC Element n | |

• Label Mapping and Request Message (type 1)

```
 0                   1                   2                   3
 0 1 2 3 4 5 6 7 8 9 0 1 2 3 4 5 6 7 8 9 0 1 2 3 4 5 6 7 8 9 0 1
```

| 0 | Label Mapping&Request | Message Length |
|---|---|---|
| Message ID ||| 
| FEC TLV |||
| Label TLV |||
| Optional Parameters |||

• Label Mapping and Request Message (type 2)

```
 0                   1                   2                   3
 0 1 2 3 4 5 6 7 8 9 0 1 2 3 4 5 6 7 8 9 0 1 2 3 4 5 6 7 8 9 0 1
```

| 0 | Label Mapping(0x0400) | Message Length |
|---|---|---|
| Message ID |||
| FEC TLV |||
| Label TLV |||
| Receiver's VC Label Request TLV |||
| Optional Parameters |||

•Receiver's VC Label Request TLV

```
 0                   1                   2                   3
 0 1 2 3 4 5 6 7 8 9 0 1 2 3 4 5 6 7 8 9 0 1 2 3 4 5 6 7 8 9 0 1
```

| 1 | 1 | Type = 0x03E01 | Length |
|---|---|---|---|

FIG. 7

FEC TLV of Label Mapping and Request Message shown in Fig. 7

| VPN FEC TLV | Address Family | VPN FEC Length |
|---|---|---|
| 8 Octet VPN Identifier (Route Distinguisher) from RFC 2547 ||| 
| OutPort Num | L2 VC (Variable length) ||

FIG. 8

METHOD FOR SETTING UP QOS SUPPORTED BI-DIRECTIONAL TUNNEL AND DISTRIBUTING L2VPN MEMBERSHIP INFORMATION FOR L2VPN USING EXTENDED LDP

BACKGROUND OF THE INVENTION

1. Field of the Invention

The present invention relates to a method for setting up a QoS (Quality-of-Service) supported bi-directional tunnel and distributing L2VPN (Layer-2 Virtual Private Network) membership information for an L2VPN using an extended LDP (Label Distribution Protocol), wherein the method can more readily and efficiently manage L2VPN service and continuously provide better QoS in a customer network by extending the LDP to provide the L2VPN service.

2. Description of the Prior Art

MPLS (Multi Protocol Label Switching) is standard technology capable of improving the efficiency of a network and readily managing the network. In relation to an OSI (Open Systems Interconnection) basic reference model, the MPLS enables most packets to be transferred by Layer-2 switching rather than Layer-3 routing, enables traffic to be entirely distributed so that the traffic can be rapidly processed, and enables the network to readily be managed for better QoS (Quality-of-Service). For these reasons, the MPLS is expected to be adopted in a network for transmitting traffic data of various hybrid traffic types in the future.

The MPLS technology started from obtaining the scalability and flexibility of the Layer-3 routing and a higher performance and traffic management function of the Layer-2 switching by separating data forwarding and routing. Moreover, the MPLS technology is being standardized under the name of GMPLS (Generalized MPLS) as a generalized control component, which supports recently not only packet switching but also all of time-division switching, wavelength switching and fiber switching. As the MPLS/GMPLS technology provides various applications to control the Internet, more interest has been focused on the MPLS/GMPLS technology. Two representative applications are VPN (Virtual Private Network) service and traffic engineering service. Instead of service provided through a pre-existing leased line, the VPN service shares resources of a network of an SP (Service Provider), provides the scalability, stability, flexibility and security of the network, and connects sites associated with a plurality of private networks. More interest has been focused on the VPN service in that it provides high value-added service using the current Internet.

The MPLS/GMPLS technology is a standardized technology proposed to address a plurality of disadvantages associated with IP (Internet Protocol) technologies in the pre-existing Internet. Because the conventional IP technologies provide only best effort service through routing, they could not provide better QoS/CoS (Class-of-Service) required in transmitting current multimedia traffic data, that is, better QoS of a specific level. Further, in all the IP technologies, only the shortest routing path of all routing paths is first searched for according to a shortest path first rule. For this reason, the network could not be efficiently operated through the conventional IP technologies. Moreover, where a predetermined node or link of the network is failed, there is a problem in that the network cannot be stably operated because it takes much time to detect the failure through a routing protocol and bypass data to another path.

On the other hand, in comparison with the conventional IP technologies, the MPLS/GMPLS technology can efficiently employ the resources of the network by using the traffic engineering service, which can designate a specific router to each path. Moreover, there is an advantage in that the MPLS/GMPLS technology can support different QoS/CoS according to an LSP (Label Switched Path) being an MPLS/GMPLS path. Thus, the MPLS/GMPLS technology can provide high quality service differentiated from the conventional technology. Also, there is another advantage in that the traffic engineering service can be supported for the sake of the network efficiency. Furthermore, a bypass connection associated with each connection can be set in advance, against the failure of a specific node or link, thereby stably operating the network.

As the MPLS technology has more merits in comparison with the conventional IP technologies for use in the Internet, more interest and research is directed toward MPLS based VPN services in comparison with IP-based VPN services. IP tunneling-based VPN associated with basic VPN service has excellent security, but it is difficult to support better QoS in the IP tunneling-based VPN. Further, there is another disadvantage in that extension of the IP tunneling-based VPN is restricted due to a mesh structure and it is not easy to install and manage the IP tunneling-based VPN. On the other hand, the MPLS based VPN service has excellent extensibility and can support differentiated QoS. Moreover, there is another advantage in that the MPLS based VPN can easily manage services and an operating system in comparison with others.

ISPs (Internet Service Providers) for providing the VPN service can select two structures, which include an L2VPN (Layer-2 VPN) and an L3VPN (Layer-3 VPN). Their selections may be different according to technical support capabilities of edge equipment, i.e., a PE (Provider Edge), provided in the conventional ISPS. If the conventional PE has a routing protocol such as a BGP (Boarder Gateway Protocol) embedded therein and routing capability, it can easily provide the L3VPN service. Otherwise, if the conventional PE does not have the routing capability, it can easily provide the L2VPN service with low-cost equipment, which does not require the routing function. Where the VPN service is provided to transparently connect CE (Customer Edge) sites, which provide Layer-2 services such as an ATM (Asynchronous Transfer Mode), frame relay and Ethernet, a structure of the L2VPN is more appropriate.

Also, to distribute information associated with a VC (Virtual Circuit) connection being a connection between a PE and a CE to the remote PE, that is, to distribute L2VPN membership information between the PE and CE, a method for employing extension of a routing protocol such as the BGP or OSPF (Open Shortest Path First) has been proposed. However, this method needs the routing protocol embedded in the PE equipment by which the L2VPN service can be provided. The information distribution can be enabled through the extension of an LDP (Label Distribution Protocol), which can be used for a tunnel between PEs. The information distribution can be enabled by setting up a target session of the LDP and distributing a label for a VC connection. At this time, the routing protocol does not have to be necessarily mounted in the PE equipment.

SUMMARY OF THE INVENTION

The present invention provides a method for setting up a QoS (Quality-of-Service) supported bi-directional tunnel and a method for distributing L2VPN (Layer-2 Virtual Private Network) membership information between a PE (Provider Edge) and a CE (Customer Edge) using extension of an LDP (Label Distribution Protocol) being one of signaling protocols of MPLS (Multi Protocol Label Switching)/GMPLS (Generalized MPLS) technologies to provide L2VPN service. The present invention uses MPLS technologies providing various merits to easily set up an essential QoS supported bi-directional connection when providing Ethernet L2VPN service through a public network. The present invention can easily and efficiently manage the L2VPN service by extending and providing the LDP being one of signaling protocols, and provides an L2VPN control device continuously supporting better QoS/CoS (Class-of-Service) services provided from a customer network. Two types of connections are needed to provide the L2VPN service. One is a tunnel connection used for searching for and accessing termination PE equipment, the other is a VC (Virtual Circuit) connection used for searching for and accessing CE equipment being destination customer edge equipment from PE equipment. The present invention includes the extended LDP for setting up a bi-directional tunnel connection between PEs and a virtual connection between a PE and a VPN CE, that is, for distributing L2VPN membership information. The LDP is extended to set up the virtual connection and simultaneously distribute Layer-2 configuration information to other sites. The present invention provides VPN DNS managing information of PEs coupled to a public network and information of PEs belonging to each VPN group.

Also, to provide the L2VPN service in accordance with the present invention, PE equipment includes an L2VPN control device providing VPN DNS of the present invention, an extended LDP for setting up a QoS supported bi-directional tunnel connection, an extended LDP for label distribution associated with a QoS supported virtual connection, i.e., L2VPN membership information distribution, and a VPN management block managing VPN information. CE equipment needs only a simple Layer-2 connection providing function for the L2VPN service.

In addition, the present invention provides a method for setting up a tunnel and distributing membership information in an L2VPN (Layer-2 Virtual Private Network), the method capable of setting up and releasing a bi-directional connection necessary for transparently providing Layer-2 service, extending and providing an LDP (Label Distribution Protocol) to provide Layer-2 configuration information, and providing, within the VPN, better QoS (Quality-of-Service) associated with an ATM (Asynchronous Transfer Mode) or the Ethernet, which was previously provided within a customer site.

In accordance with one aspect of the present invention, the above and other objects can be accomplished by the provision of a method for setting up an L2VPN (Layer-2 Virtual Private Network) bi-directional tunnel using an extended LDP (Label Distribution Protocol) in a network providing MPLS (Multi Protocol Label Switching)-based L2VPN service, which includes a plurality of VPN provider edges (PEs), a plurality of VPN customer edges (CEs) connected to the PEs and a VPN DNS (Domain Name Service) server for managing PE information associated with a plurality of VPNs, comprising the steps of: a) registering corresponding VPN information in the VPN DNS server if a CE belonging to a specific VPN is added to a first PE; b) where the first PE sets up a tunnel for the added CE, requesting the VPN DNS server to transmit information associated with at least one n-th PE belonging to the specific VPN and receiving the information associated with the at least one n-th PE as a result of the request; c) allowing the first PE to check whether a basic session coupled to the n-th PE exists, allowing the first PE to transmit a label mapping-request message, simultaneously containing a label distributed for a uni-directional tunnel connection and a label request, to the n-th PE after setting up a new basic session if the basic session coupled to the n-th PE exists, and setting up the uni-directional tunnel connection directed to the first PE from the n-th PE; and d) allowing the n-th PE, receiving the label mapping-request message from the first PE, to transmit a label-mapping message having a label to be distributed to the first PE and setting up a uni-directional tunnel connection directed to the n-th PE from the first PE.

Here, service provided from the VPN DNS server may be preferably provided from a specific PE connected to a VPN sharing network or a specific server connected to a specific network. Preferably, the PE may request the VPN DNS server to register addition or deletion of a corresponding VPN member where a CE belonging to a specific VPN is added or deleted to or from the PE, because all the PEs recognize a device (a VPN DNS server, a specific PE or a specific server) providing VPN DNS.

Preferably, the label mapping-request message contained in the step c) may include a label for a uni-directional tunnel connection directed to the first PE transmitting the message from the at least one n-th PE receiving the message, and a label distribution request for a reverse tunnel connection. Preferably, the label mapping-request message may use an extended LDP including a sender's FEC (Forwarding Equivalence Class) TLV (Type-Length-Value) containing FEC being an interface address of the first PE transmitting the message having a request for label distribution in a reverse direction.

In accordance with another aspect of the present invention, there is provided a method for distributing L2VPN (Layer-2 Virtual Private Network) membership information using an extended LDP (Label Distribution Protocol) in a network providing MPLS (Multi Protocol Label Switching)-based L2VPN service, which includes a plurality of VPN provider edges (PEs), a plurality of VPN customer edges (CEs) connected to the PEs and a VPN DNS (Domain Name Service) server for managing PE information associated with a plurality of VPNs, comprising the steps of: a) registering corresponding VPN information in the VPN DNS server if a CE belonging to a specific VPN is added to a first PE; b) setting up a tunnel connection between the PEs belonging to the specific VPN; C) requesting the VPN DNS server to transmit information associated with at least one n-th PE belonging to the specific VPN to which the CE belongs so that the first PE can distribute L2VPN membership information associated with the added CE, and receiving the information associated with the at least one n-th PE as a result of the request; d) allowing the first PE to check whether a target session coupled to the n-th PE exists, allowing the first PE to distribute the membership information associated with the added CE to the n-th PE after setting up a new target session if the target session coupled to the n-th PE does not exist, and transmit a label mapping-request message having a label request for distributing membership information belonging to a corresponding VPN; and e) allowing the n-th PE, receiving the label mapping-request message from the first PE, to distribute the membership information belonging to the VPN connected to its own PE through a label-mapping message, thereby extending the LDP and distributing L2VPN membership information between the PE and the CE.

As described above, the extended LDP may be used for L2VPN membership information distribution between the PE and the CE and a request for distributing membership information belonging to a VPN group coupled to the at least one n-th PE.

Where a CE belonging to a specific VPN is added or deleted to or from the PE, the PE requests the VPN DNS server to register or release the VPN group information associated with the added CE, and the CE sets up or releases a Layer-2 connection directed to the PE.

Where a new CE is added to the PE, the label mapping-request message contained in the step d) may include a label for membership information distribution associated with the added CE, and a distribution request for membership information belonging to the same VPN coupled to the n-th PE receiving the message. The label mapping-request message is of a type of a message including a label distribution request, or uses a format additionally including a receiver's VC (Virtual Circuit) label request TLV (Type-Length-Value) being specific TLV.

Preferably, the label mapping-request message and the label-mapping message used for the L2VPN membership information distribution may include VPN FEC (Forwarding Equivalence Class) TLV indicating FEC associated with the membership information, and the VPN FEC may include information (VPN ID) indicating a VPN to which a corresponding CE belongs, information of an output port connected to a corresponding CE from the PE, and information associated with a Layer-2 connection for the PE and the CE.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
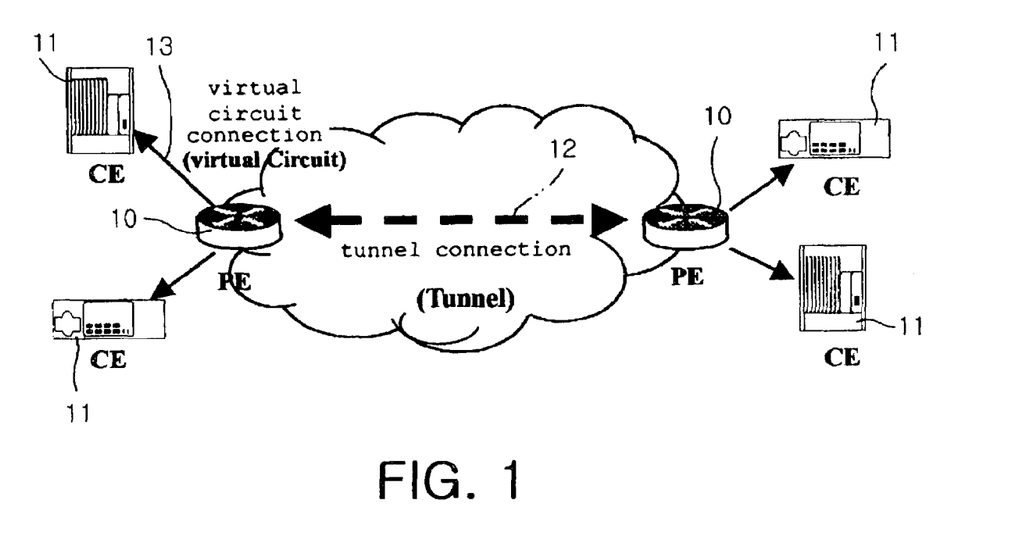
FIG. 1 is a view illustrating pieces of equipment necessary for an L2VPN (Layer-2 Virtual Private Network) and a connection between the pieces of equipment in accordance with the present invention.

FIG. 1 is a view illustrating pieces of equipment necessary for an L2VPN (Layer-2 Virtual Private Network) and a structure of a connection between the pieces of equipment in accordance with the present invention. As shown in FIG. 1, pieces of equipment basically needed to provide MPLS (Multi Protocol Label Switching)-based VPN service include PE (Provider Edge) equipment 10 being edge equipment of an ISP (Internet Service Provider) providing VPN service and CE (Customer Edge) equipment 11 provided in a customer site. The L2VPN service in accordance with the present invention is basically implemented by the PE equipment 10, and the PE equipment 10 can control the L2VPN service. The CE equipment 11 simply sets up only a Layer-2 connection directed to the PE equipment 10 in order to be registered in a specific VPN. That is, the PE equipment 10 provides an extended LDP (Label Distribution Protocol) of the present invention, and has a function capable of setting up a QoS supported bi-directional connection and a function capable of distributing membership information. The CE equipment 11 does not need an MPLS signaling function, a routing function, etc., and can set up a connection using equipment having a simple function. There are a tunnel connection 12 used for searching for and accessing the termination PE equipment 10 in order to arrive at a destination and a VC (Virtual Circuit) used for searching for and accessing a CE equipment 11, which is a destination customer edge equipment, from the termination PE equipment 10. To readily set up the connection, the PE equipment 10 has a VPN DNS (Domain Name Service) function embedded therein, or uses the function.

Figure 2:
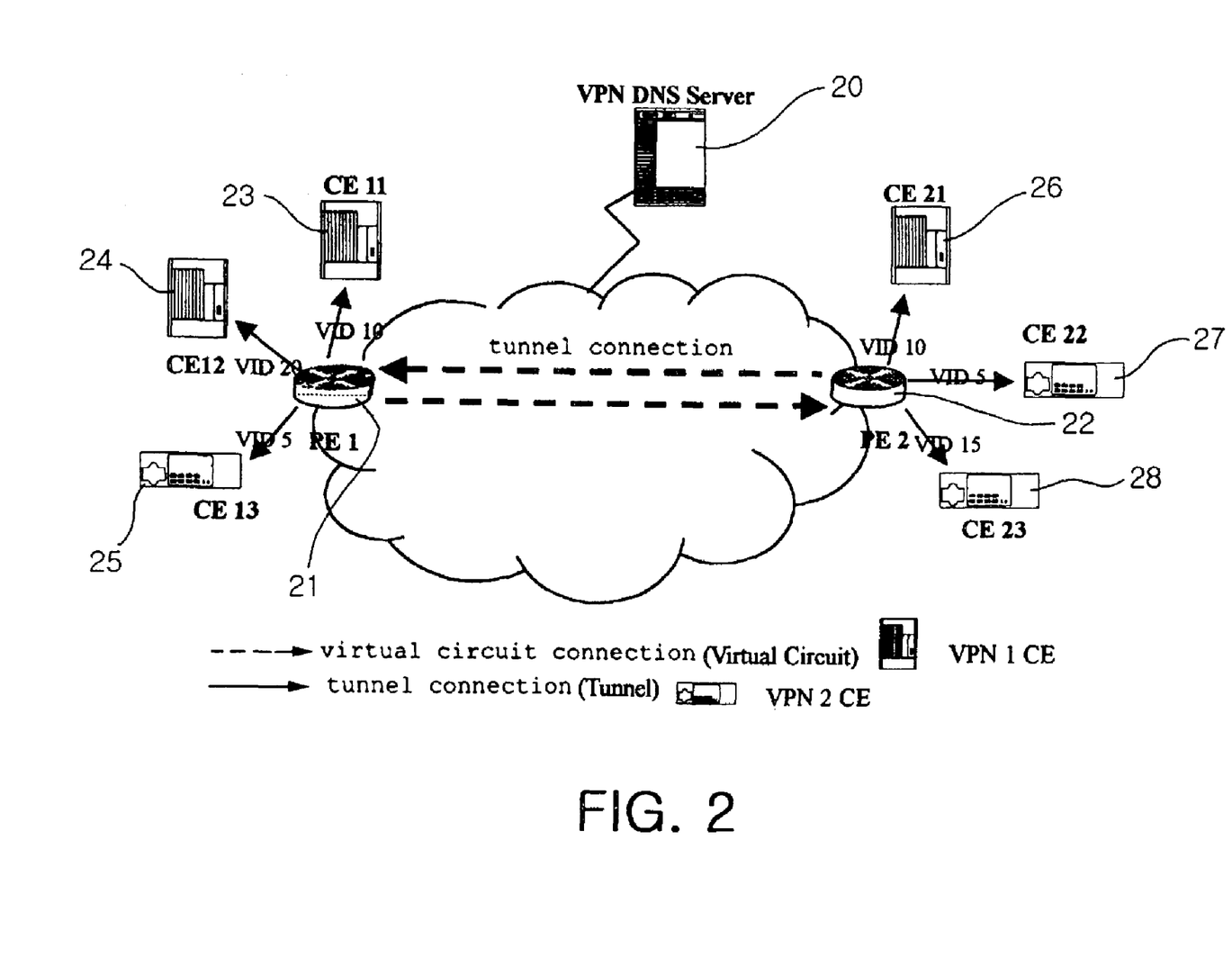
FIG. 2 is a view illustrating a configuration of an MPLS (Multi Protocol Label Switching) based Ethernet-L2VPN in accordance with an embodiment of the present invention.
Figure 3:
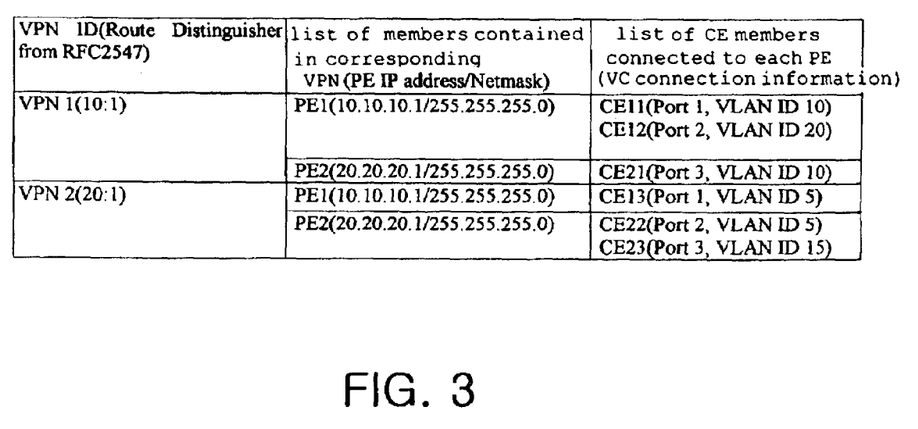
FIG. 3 is a view illustrating contents of management information of a VPN DNS (Domain Name Service) server in the VPN shown in FIG. 2.

FIG. 2 is a view illustrating a configuration of an MPLS based Ethernet-L2VPN in accordance with an embodiment of the present invention. As shown in FIG. 2, the MPLS based Ethernet-L2VPN basically includes pieces of PE equipment 21 and 22 and a plurality of pieces of CE equipment 23 to 28 provided in customer sites so that the VPN service can be provided. Moreover, the MPLS based Ethernet-L2VPN may include a VPN DNS server 20 for providing the VPN DNS function. A tunnel connection is set up between the termination PE1 21 and the termination PE2 22, and the termination PE1 and PE2 21 and 22 are connected to the pieces of CE equipment 23 to 28 by a VC connection. At this time, a specific server coupled to the VPN may carry out the VPN DNS function. Alternatively, specific PE equipment of a shared network may carry out the VPN DNS function. Hereinafter, the VPN DNS service in accordance with the present invention will be briefly described. Contents of management information associated with the VPN DNS include a VPN ID (e.g., Route Distinguisher from RFC 2547), a PE membership list (e.g., PE IP address/netmask), a CE membership list (e.g., VC connection information), etc. as membership information of the VPN. A table associated with the VPN DNS management information is shown in FIG. 3. Referring to FIG. 3, where the VPN ID is VPN 1 (10:1), a PE membership list of the VPN includes PE1 and PE2, and an IP address/netmask of the PE1 and an IP address/netmask of the PE2 are "10.10.10.1/255.255.255.0" and "20.20.20.1/255.255.255.0", respectively. A list of CE members connected to the PE1 includes a CE11 and a CE12. Connection information associated with the CE11 and the CE12, i.e., VC connection information associated with the CE11 and CE12 are "Port1, VLAN ID 10" and "Port2, VLAN ID 20", respectively. A list of CE members connected to the PE2 includes a CE21, and connection information for the CE2, i.e., VC connection information associated with the CE2 is "Port3, VLAN ID 10". Those skilled in the art will appreciate that the VPN DNS management information shown in FIG. 3 is exemplary and the present invention is not limited thereto.

According to addition or deletion of information of a VPN group connected to each PE 21 or 22, the PE 21 or 22 should register corresponding information in the equipment providing the VPN DNS or release the registration of the corresponding information from the equipment. Where a tunnel should be set up, the VPN DNS information is used for identifying information of other PEs belonging to the same VPN to which a corresponding PE should set up the tunnel. The VPN DNS information is also used for identifying information of PE members within the same VPN and setting up a target session by a LDP (Label Distribution Protocol) to implement the distribution of label information for the VC connection, i.e., the distribution of L2VPN membership information.

Hereinafter, a description will be given of a procedure of carrying out the extended label distribution to set up a bi-directional tunnel between PEs. In the setup of the bi-directional tunnel connection between the PEs, the PEs can be connected to the tunnel one by one, or VPN groups between the PEs can be connected to the tunnel one by one. Alternatively, three experimental bits of an LSP label can be differently set and a plurality of QoS supported tunnels can be set up so that a QoS based tunnel can be set up between the PEs. Alternatively, the plurality of QoS supported tunnels can be connected to each VPN group between the PEs.

Figure 4:
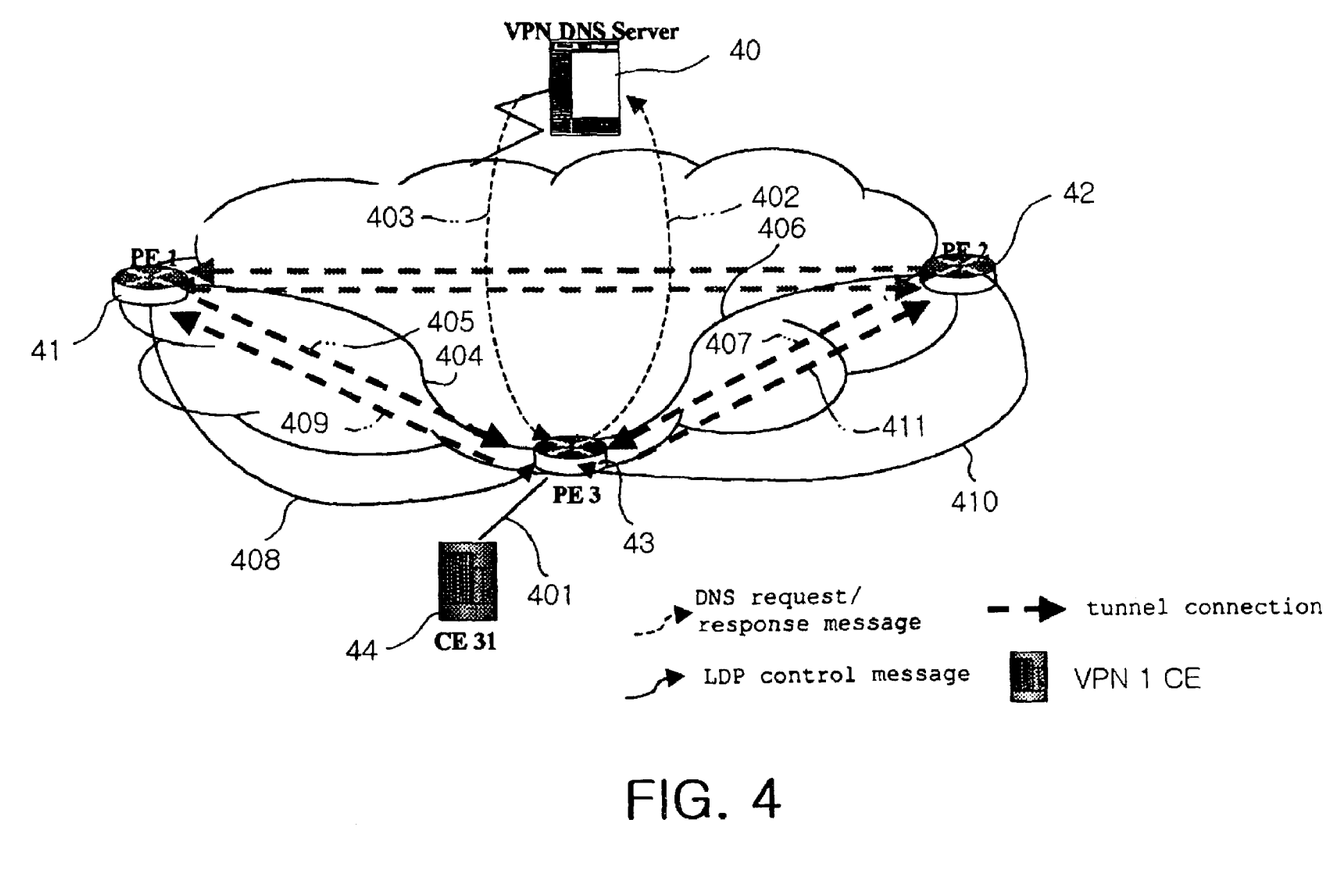
FIG. 4 is a view illustrating a configuration of the VPN for carrying out a procedure of setting up a bi-directional tunnel connection between PEs (Provider Edges) in accordance with an embodiment of the present invention.

A case where one tunnel connection between the PEs among the various types of tunnel connections is set up will be described with reference to FIG. 4. FIG. 4 is a view explaining a procedure of setting up a bi-directional tunnel connection between PEs in accordance with an embodiment of the present invention. FIG. 4 shows a case where a CE31 44 belonging to the VPN1 is added to a PE3 43 in the MPLS based Ethernet-L2VPN shown in FIG. 2. First, the CE31 44 belonging to the VPN1 is added to the PE3 43, and a Layer-2 connection is set up between the PE3 43 and the CE31 44 (401). Thus, the PE3 43 registers corresponding addition information in the VPN DNS server 40 placed in the shared network and requests the VPN DNS server 40 to transmit information associated with other PEs placed in the network (402). As a result, the PE3 43 obtains information associated with the PE1 41 and the PE2 42 placed in the network from the VPN DNS server 40 (403). The PE3 43 checks whether a basic session between the PE1 41 and the PE3 43 exists. If the basic session between the PE1 41 and the PE3 43 does not exist, the PE3 43 transmits a label mapping-request message having a distributed label and a label request to the PE1 41 after setting up a new session to the PE1 41 (404). And then a uni-directional tunnel connection directed to the PE3 43 from the PE1 41 is then set up (405). Similarly, the PE3 43 checks whether a basic session between the PE2 42 and the PE3 43 exists. If the basic session between the PE2 42 and the PE3 43 does not exist, the PE3 43 transmits a label mapping-request message to the PE2 42 after setting up a new session coupled to the PE2 42 (406). And then a uni-directional tunnel connection directed to the PE3 43 from the PE2 42 is then set up (407). Moreover, the PE1 41, receiving the label mapping-request message from the PE3 43, transmits a label-mapping message having a label dis-tributed to the PE3 43 (408). Through the transmission of the label-mapping message, a uni-directional tunnel connection directed to the PE1 41 from the PE3 43 is then set up (409). Similarly, the PE2 42, receiving the label mapping-request message from the PE3 43, transmits a label-mapping message having a label distributed to the PE3 43 (410). A tunnel connection directed to the PE2 42 from the PE3 43 is set up (411). Thus, a bi-directional tunnel connection between the PEs can be set up by transmitting two control messages between the PEs.

A method for releasing the bi-directional tunnel setup can be carried out by transmitting a label withdrawal message and a label release message to each PE as in the pre-existing LDP. The tunnel release method is the same as the pre-existing LDP release procedure. In short, where all CEs belonging to a specific VPN are separated from a first PE, a bi-directional tunnel release method similar to the pre-existing LDP transmits, to each n-th PE (n is a positive integer more than "1"), a label withdrawal message used for a uni-directional tunnel directed to the first PE from each n-th PE and then transmits, to each n-th PE, a label release message used for a uni-directional tunnel directed to the first PE from each n-th PE.

Figure 5:
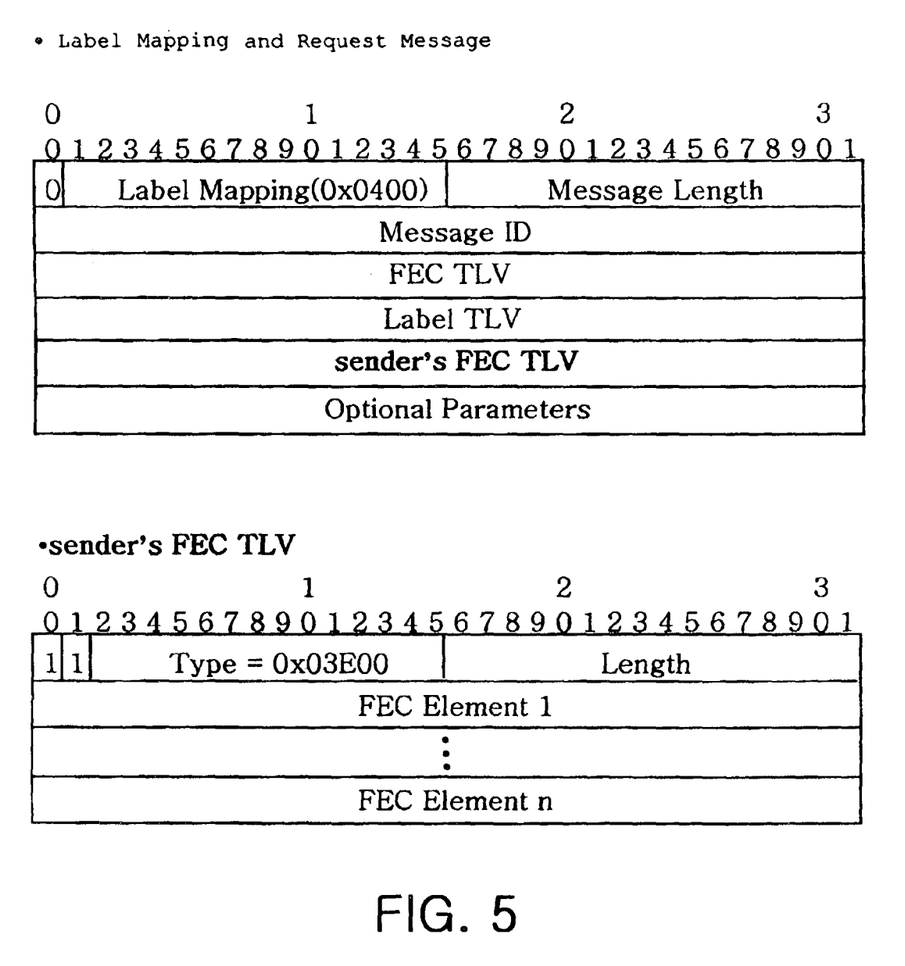
FIG. 5 is a view illustrating a format of a label mapping-request message used for an LDP (Label Distribution Protocol) extended to set up a bi-directional tunnel connection between the PEs (Provider Edges) in accordance with an embodiment of the present invention.

A format of an exemplary label mapping-request message being a new message of an extended LDP to set up the bi-directional tunnel described above is shown in FIG. 5. That is, FIG. 5 is a view illustrating a format of a label mapping-request message used for an extended LDP to set up a bi-directional tunnel connection between the PEs in accordance with an embodiment of the present invention. As shown in FIG. 5, the label mapping-request message with a formation basically similar to that of the label-mapping message further includes a sender's FEC (Forwarding Equivalence Class) TLV (Type-Length-Value) so that an LER (Label Edge Router) receiving the message can carry out the label distribution to another LER transmitting the message. Because the sender's FEC TLV contains FEC information being an interface address of the LER transmitting the message, the LER receiving the message can carry out the label distribution using the FEC information contained in the sender's FEC TLV. In the newly added sender's FEC TLV, first and second bits being "U" and "F" bits are set as "1" so that an LSR (Label Switched Router) can ignore the TLV and carry out message forwarding, and a value of a TLV type is newly allocated or uses one of vendor-private TLV values.

If a downstream-on-demand distribution mode is carried out in the pre-existing LDP rather than the extended LDP in accordance with the present invention, the transmissions of four control messages are needed to set up a bi-directional tunnel connection between PEs and membership information setting is additionally needed in both PEs. Moreover, if a downstream-unsolicited distribution mode is carried out in the pre-existing LDP, the transmissions of two control messages are needed, and additional work is needed for adding, to the PE1 and the PE2, the same as information indicating that the CE31 has been added to the PE3 so that a connection directed to the PE3 from the PE1 or PE2 can be set up. On the other hand, if additional membership information associated with a CE belonging to a specific VPN group is set in a PE according to the extended LDP of the present invention, there is an advantage in that a bi-directional tunnel connection can be automatically set up between the PE and other PEs.

A procedure of setting up one tunnel between PEs as described above is applicable to various types of tunnels capable of setting up a plurality of connections between the PEs. That is, where a tunnel is set up to every VPN group between the PEs, the VPN DNS server is requested to transmit a list of PE members belonging to a corresponding VPN group, and then the tunnel connection setup can be carried out by the above-described procedure.

Figure 6:
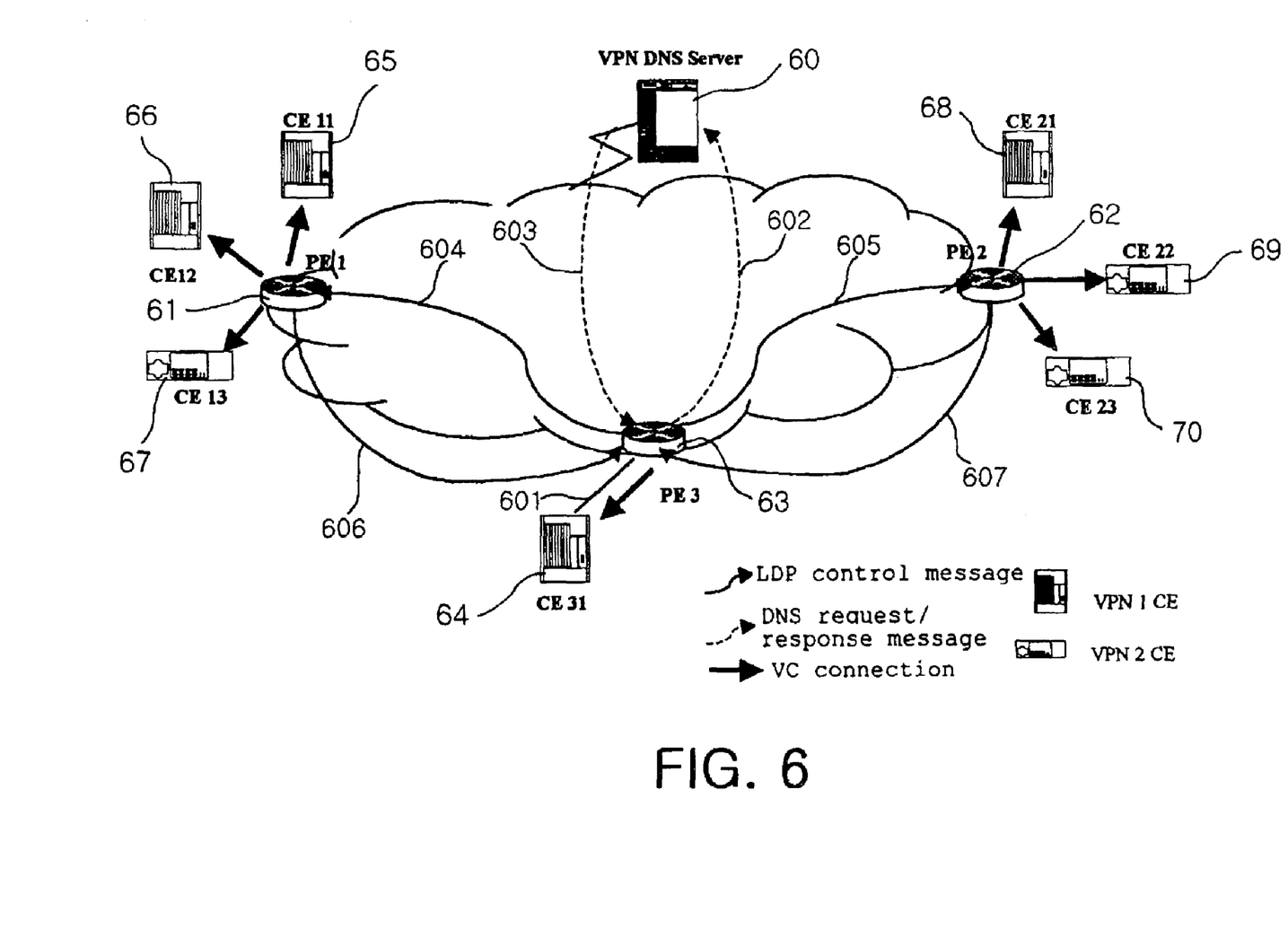
FIG. 6 is a view illustrating a configuration of the VPN for carrying out a procedure of distributing L2VPN membership information between a PE and a CE (Customer Edge)

Hereinafter, a description will be given of a procedure of carrying out the extended LDP to perform a VC connection setup between a PE and a CE, and membership information distribution associated with the VC connection setup. A VC connection between the PE and the CE is a connection used so that the PE can search for a Layer-2 connection directed to the CE in which a destination system is placed in order to arrive at the destination system. The VC connection information distribution can be referred to as L2VPN membership information distribution directed to the PE. A label distribution procedure associated with the VC connection will be described with reference to FIG. 6. FIG. 6 is a view illustrating a procedure of distributing L2VPN membership information between a PE and a CE. FIG. 6 shows a case where the CE31 belonging to the VPN1 is added to the PE3 in the MPLS based Ethernet-L2VPN shown in FIG. 2. An example shown in FIG. 6 illustrates a case where a CE belonging to a specific VPN group is first added to one PE. Here, it is assumed that a tunnel connection between PEs is set up by the above-described tunnel setup procedure. First, a CE31 64 belonging to the VPN1 is added to a PE3 63, and a Layer-2 connection is set up between the PE3 63 and the CE31 64 (601). The PE3 63 then requests a VPN DNS server 60 placed in a shared network to transmit information of other PEs belonging to a corresponding VPN group 1 (602). As a result, the PE3 63 obtains information associated with a PE1 61 and a PE2 62 being the other PEs from the VPN DNS server 60 (603). The PE3 63 then checks whether a direct target session between the PE1 61 and the PE3 63 exists. If the direct target session between the PE1 61 and the PE3 63 does not exist, the PE3 sets up a new session. The PE3 63 then distributes a label, for a VC connection directed to the CE31, to the PE1 61 and then simultaneously transmits the label mapping-request message including a label request to the PE1 61 so that the PE3 63 can distribute label information associated with a VC connection belonging to a corresponding VPN group 1 coupled to the PE1 61 (604). Similarly, the PE3 63 checks whether a direct target session between the PE2 62 and the PE3 63 exists. If the direct target session between the PE2 62 and the PE3 63 does not exist, the PE3 63 sets up a new session and then transmits, to the PE2 62, a label mapping-request message having a label for the VC connection and a label request associated with VC connections belonging to a corresponding VPN group 1 coupled to the PE2 (605). The PE1 61 and the PE2 62, receiving the label mapping-request message, distribute VC connection information belonging to the VPN group 1 coupled to each piece of equipment through a label-mapping message (606 and 607). Thus, when a new CE is added to a specific VPN, VC connection information associated with each PE can be distributed through two control messages between the PEs.

Where a CE belonging to a specific VPN group is first added to one PE, a label request is achieved in relation to a connection previously set up through the label distribution, because other PEs coupled to the CE belonging to the VPN have already carried out the label distribution associated with a corresponding VC connection.

A change of L2VPN membership information between the PE and the CE, i.e., a specific membership information release method can be carried out by transmitting a label withdrawal message to each PE as in the pre-existing LDP. In other words, where a specific CE is deleted from a first PE, the membership information change, i.e., the specific membership information release method can be carried out by transmitting the label withdrawal message to respective n-th PEs as in the preexisting LDP.

Figure 7:
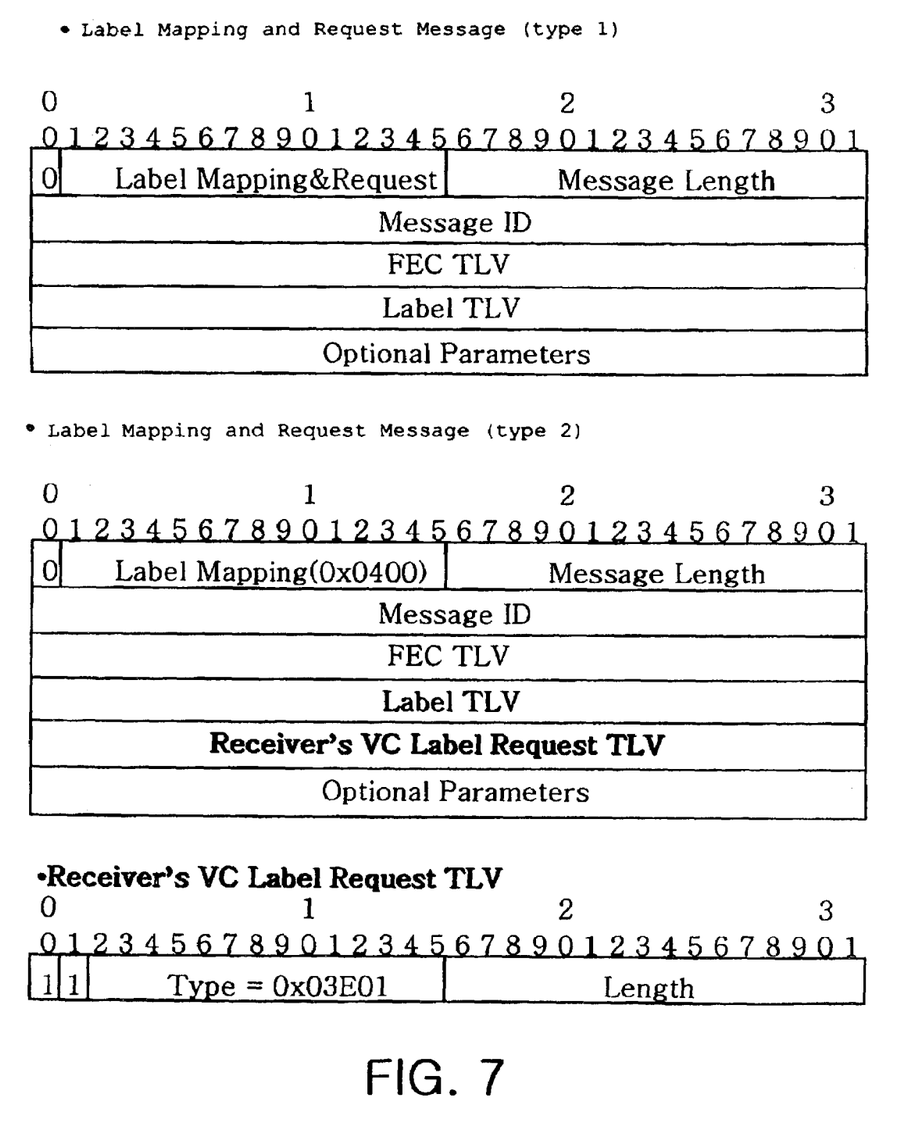
FIG. 7 is a view illustrating a format of a label mapping-request message used for an extended LDP to distribute L2VPN membership information between a PE and a CE in accordance with an embodiment of the present invention.
Figure 8:
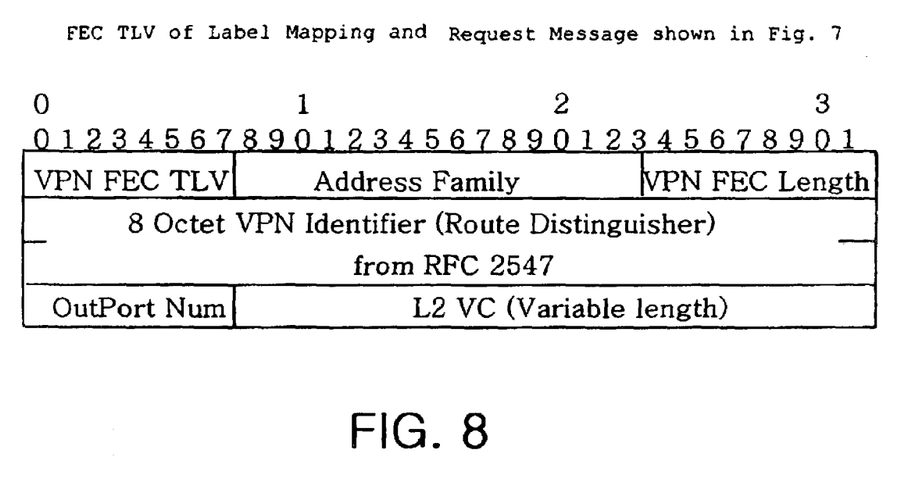
FIG. 8 is a view illustrating a format of a VPN FEC (Forwarding Equivalence Class) TLV (Type-Length-Value) used in a label mapping-request message for distributing VPN membership information.

A format of an exemplary label mapping-request message used for the label distribution associated with the above-described VC connection is shown in FIG. 7. That is, FIG. 7 is a view illustrating a format of a label mapping-request message used for an extended LDP to distribute L2VPN membership information between a PE and a CE in accordance with an embodiment of the present invention. A message of the present invention uses the same form as the label-mapping message used for the pre-existing LDP like a message type 1 shown in FIG. 7, sets only a value of a specific message type to a specific value indicating the label mapping-request message and uses it. Alternatively, like a message type 2, a message of the present invention further includes a receiver's VC label request TLV indicating a label distribution request associated with a VC connection belonging to a specific VPN of a PE receiving the message. Here, VPN group information can be obtained from VPN ID information of FEC TLV. Further, because the FEC TLV of the label mapping-request message should contain FEC information associated with a corresponding VC connection, the label mapping-request message containing the VPN FEC TLV shown in FIG. 8 is transmitted. FIG. 8 is a view illustrating a format of a VPN FEC TLV used in a label mapping-request message for distributing VPN membership information. The VPN FEC TLV includes information (VPN ID) indicating a VPN group belonging to a corresponding CE, information of an output port directed to a corresponding CE from a PE, and Layer-2 connection information for the PE and the CE. The Layer-2 connection information varies according to a type of a customer network. Where the customer network is an Ethernet network, the Layer-2 connection information can be a VLAN (Virtual Local Area Network) ID. Where the customer network is an ATM network, the Layer-2 connection information can be a VPI (Virtual Path Identifier)/VCI (Virtual Channel Identifier). Where the customer network is a frame relay network, the Layer-2 connection information can be a DLCI (Data Link Connection Identifier).

However, where a PE having a CE belonging to a specific VPN group is connected to another CE, a label-mapping message including the VPN FEC TLV instead of a label mapping-request message is transmitted when a label for a corresponding connection is distributed.

Here, the above-described label release method associated with the VC connection, i.e., the membership information change method can be carried out by transmitting a label withdrawal message to each PE as in the pre-existing LDP.

As described above, in the connection setup and label distribution procedures, a tunnel connection and a VC connection can be set up as a QoS/CoS supported connection. For this connection setup, three experimental bits of a label distributed by the LDP may be used. If a customer network associated with a VPN connected to a PE supports Layer-2 QoS based on 802.1p to an Ethernet network, three priority bits based on 802.1p of a corresponding VLAN tag are mapped to the three experimental bits of a label and distributes the mapped label, thereby providing transparent QoS/CoS services through the VPN. Similarly, where the customer network associated with a VPN coupled to a CE is the ATM network, QoS information of a corresponding ATM network is mapped to three experimental bits of a label and distributes the mapped label, thereby providing transparent QoS/CoS services through the VPN.

The present invention can provide a simple configuration with various merits and an easy setup procedure, and efficiently provide L2VPN service by implementing an L2VPN control function so that a tunnel connection and a VC connection can be provided using MPLS technologies having various merits and transparent LAN service of QoS/CoS supported in a customer network can be provided.

Further, an L2VPN control service function provided in the present invention is included in PE equipment and label distribution can easily carried out in relation to a tunnel connection and a VC connection through minimum LDP message transmissions.

Furthermore, the present invention can provide a QoS/CoS supported bi-directional connection, and CE equipment of the present invention needs a simple Layer-2 connection providing a specific VPN connection function, thereby providing simplicity of an essential function.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for setting up an L2VPN (Layer-2 Virtual Private Network) bi-directional tunnel using an extended LDP (Label Distribution Protocol) in a network providing MPLS (Multi Protocol Label Switching) based L2VPN service, which includes a plurality of VPN provider edges (PEs), a plurality of VPN customer edges (CEs) connected to the PEs and a VPN DNS (Domain Name Service) server for managing PE information associated with a plurality of VPNs, comprising the steps of:
   a) registering corresponding VPN information in the VPN DNS server if a CE belonging to a specific VPN is added to a first CE;
   b) where the first PE sets up a tunnel for the added CE, requesting the VPN DNS server to transmit information associated with at least one other PE belonging to the specific VPN and receiving the information associated with the at least one other PE as a result of the request;
   c) allowing the first PE to check whether a basic session between the other PE and the first PE exists, allowing the first PE to set up a new basic session for the other PE to transmit a label mapping-request message, simultaneously containing a label distributed for a uni-directional tunnel connection and a label request, to the other PE if the basic session between the other PE and the first PE dose not exist, and setting up the uni-directional tunnel connection directed to the first PE from the other PE; and
   d) allowing the other PE, receiving the label mapping-request message from the first PE, to transmit a label-mapping message having a label to be distributed to the first PE and setting up a uni-directional tunnel connection directed to the other PE from the first PE.

2. The method according to claim 1, wherein service provided from the VPN DNS server is provided from a specific PE connected to a VPN sharing network or a specific server connected to a specific network.

3. The method according to claim 1, wherein the PE requests the VPN DNS server to register addition or deletion of a corresponding VPN member where a CE belonging to a specific VPN is added or deleted to or from the PE, because the PE recognizes a device providing VPN DNS.

4. The method according claim 1 wherein the CE sets up or releases a Layer-2 connection directed to the PE where a CE belonging to a specific VPN is added or deleted to or from the PE.

5. The method according to claim 1, wherein the label mapping-request message contained in the step c) includes a label for a uni-directional tunnel directed to the first PE transmitting the message from the at least one other PE receiving the message, and a label distribution request for a reverse tunnel.

6. The method according to claim 5, wherein the label mapping-request message uses an extended LDP including a sender's PEC (Forwarding Equivalence Class) TLV (Type-Length-Value) containing PEC being an interface address of the first PE transmitting the message having a request for label distribution in a reverse direction.

7. The method according to claim 1, wherein a tunnel setup between the PEs is achieved by a QoS (Quality-of-Service)/CoS (Class-of-Service) supported connection through extended label distribution.

8. The method according to claim 7, wherein QoS/CoS services are provided by mapping three experimental bits of a label distributed by the LDP to priority information provided by a customer network and distributing the label.

9. A method for distributing L2VPN (Layer-2 Virtual Private Network) membership information using an extended LDP (Label Distribution Protocol) in a network providing MPLS (Multi Protocol Label Switching) based L2VPN service, which includes a plurality of VPN provider edges (PEs), a plurality of VPN customer edges (CEc) connected to the PEs and a VPN DNS (Domain Name Service) server for managing PE information associated with a plurality of VPNs, comprising the steps of:
   a) registering corresponding VPN information in the VPN DNS server if a CE belonging to a specific VPN is added to a first PE;
   b) setting up a tunnel connection between the PEs belonging to the specific VPN;
   c) requesting the VPN DNS server to transmit information associated with at least one other PE belonging to the specific VPN to which the CE belongs so that the first PE can distribute L2VPN membership information associated with the added CE, and receiving the information associated with the at least one other PE as a result of the request;
   d) allowing the first PE to check whether a target session between the other PE and the first PE exists, allowing the first PE to set up a new target session for the other PE to distribute the membership information associated with the added CE to the other PE if the target session between the other PE and tile first PE does not exist, and transmit, to the other PE, a label mapping-request message having a label request for distributing membership information belonging to a corresponding VPN; and
   e) allowing the other PE, receiving the label mapping-request message from the first PE, to distribute the membership information belonging to the VPN connected to its own PE through a label-mapping message, thereby extending the LDP and distributing L2VPN membership information between the PE and the CE.

10. The method according to claim 9, wherein service provided from the VPN DNS server is providedfrom a specific PE connected to a VPN sharing network or a specific server connected to a specific network.

11. The method according to claim 9, wherein the PE requests the VPN DNS server to register addition or deletion of a corresponding VPN member where a CE belonging to a specific VPN is added or deleted to or from the PE, because the PE recognizes a device providing VPN DNS.

12. The method according to claim 9, wherein the CE sets up or releases a Layer-2 connection directed to the PE where a CE belonging to a specific VPN is added or deleted to or from the PE.

13. The method according to claim 9, wherein the label mapping-request message contained in the step d) includes a label distribution for membership information distribution associated with the added CE, and a distribution request for membership information belonging to the same VPN coupled to the other PE receiving the message.

14. The method according to claim 13, wherein the label mapping-request message is of a type of a message including a label distribution request, or uses a format additionally including a receiver's VC (Virtual Circuit) label request TLV (Type-Length-Value) being specific TLV.

15. The method according to claim 9, wherein the label mapping-request message and the label-mapping message used for the L2VPN membership information distribution include VPN PEC (Forwarding Equivalence Class) TLV indicating PEC associated with the membership information, and die VPN PEC includes information (VPN ID) indicating a VPN to which a corresponding CE belongs, information of an output port connected to a corresponding CE from the PE, and information associated with a Layer-2 connection for the PE and the CE.

16. The method according to claim 9, wherein the step e) further includes a step of:
  e1) allowing the at least one other PE to transmit, to the first PE, a label-mapping message for distributing membership information associated with a VC connection belonging to a corresponding VPN group connected to its own PE and carry out label distribution.

17. The method according to claim 9, wherein a virtual connection between the PE and the CE is set up as a QoS (Quality-of-Service)/CoS (Class-of-Service) supported connection through extended label distribution.

18. The method according to claim 17, wherein QoS/CoS services are provided by mapping three experimental bits of a label distributed by the LDP to priority information provided by a customer network and distributing the label.

* * * * *